United States Patent [19]

Towry

[11] 3,884,136
[45] May 20, 1975

[54] EGG ROLL ASSEMBLY MACHINE

[75] Inventor: Jack R. Towry, Clayton, Mo.

[73] Assignee: Ralston Purina Company, St. Louis, Mo.

[22] Filed: Aug. 24, 1972

[21] Appl. No.: 283,346

[52] U.S. Cl. .............. 99/450.4; 99/450.7; 141/166; 141/331; 53/370
[51] Int. Cl. ............................................ B32b 31/04
[58] Field of Search .... 99/113, 450.4, 450.5, 450.6, 99/450.7; 425/804; 141/103, 166, 283, 331; 53/112 B, 370

[56] References Cited
UNITED STATES PATENTS

| | | | |
|---|---|---|---|
| 2,764,106 | 9/1956 | Maickel | 141/103 X |
| 2,867,537 | 1/1959 | Whitaker | 141/103 X |
| 3,091,903 | 6/1963 | Kammerer | 141/166 X |
| 3,112,777 | 12/1963 | Lohse | 141/166 X |
| 3,125,134 | 3/1964 | Johnson | 141/103 X |
| 3,254,467 | 6/1966 | Garrow | 53/112 B |
| 3,394,528 | 7/1968 | Tipper | 53/112 B |
| 3,401,499 | 9/1968 | Jahnke | 53/112 B |
| 3,754,371 | 8/1973 | Walker | 53/370 X |

Primary Examiner—Harvey C. Hornsby
Attorney, Agent, or Firm—Veo Peoples, Jr.; Lawrence J. Hurst

[57] ABSTRACT

An apparatus is disclosed for automatically assembling an egg roll product for subsequent processing. The casing or container for holding the egg product is clamped onto a conveyor and conveyed along a predetermined path of travel. The container passes beneath a first station wherein a predetermined quantity of liquid albumen is metered into the container, a second station wherein an egg yolk body is inserted into the container and a third station wherein the casing is sealed and removed from the conveyor such that the egg roll product is prepared for subsequent handling.

23 Claims, 9 Drawing Figures

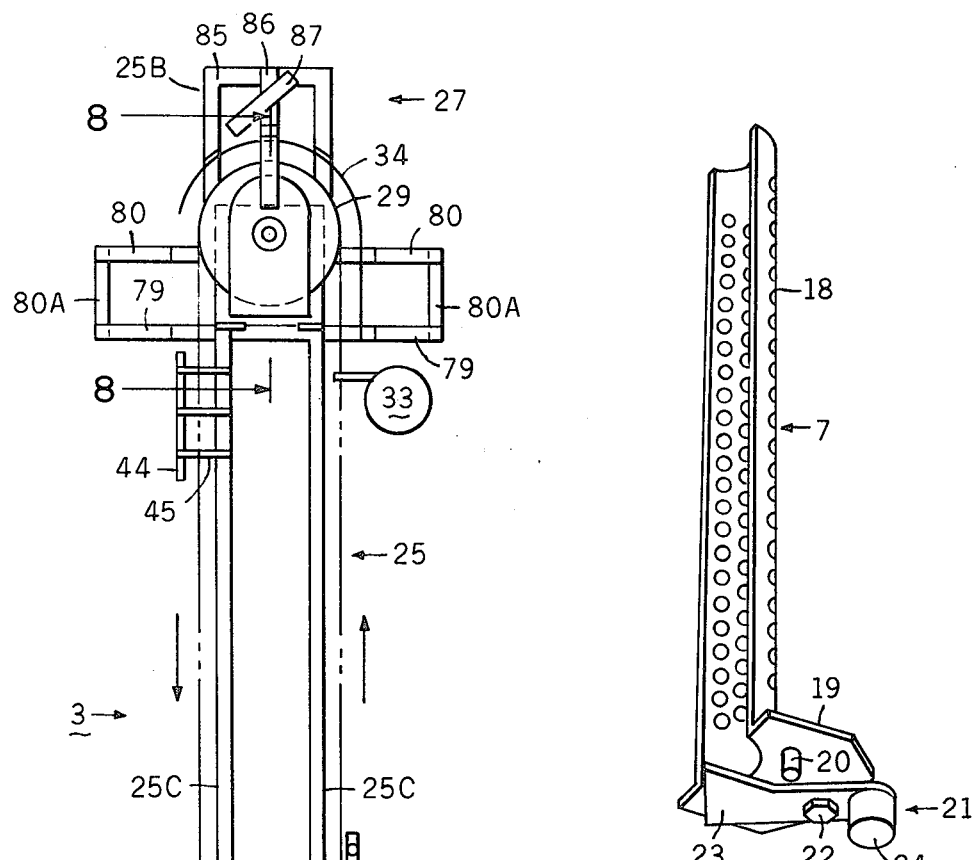
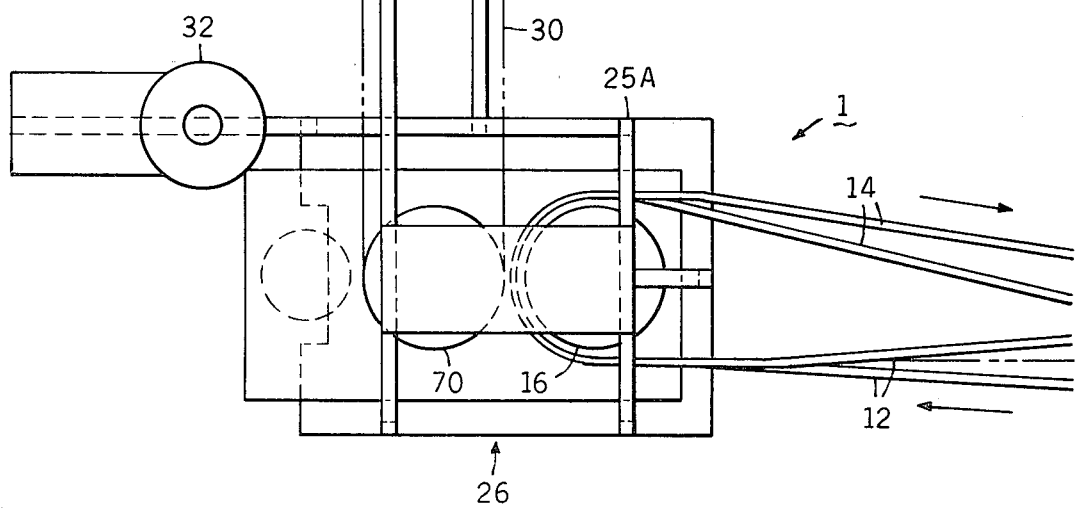
FIG. 1a
FIG. 3

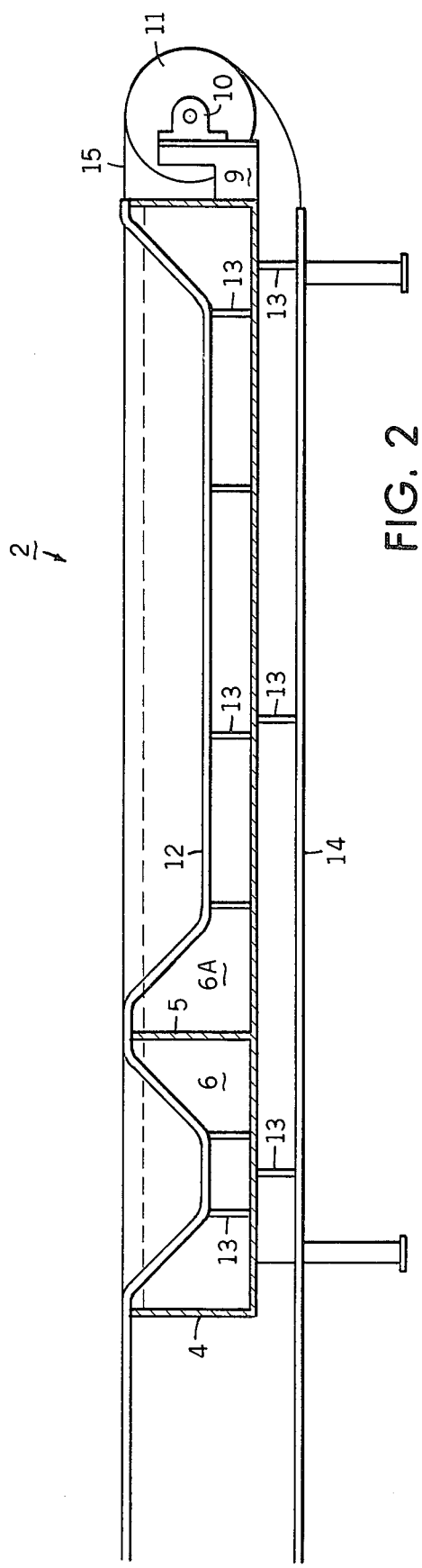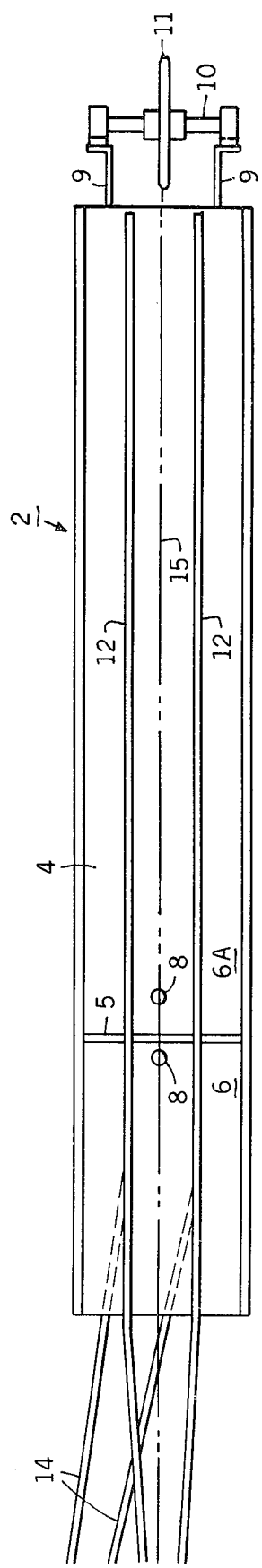

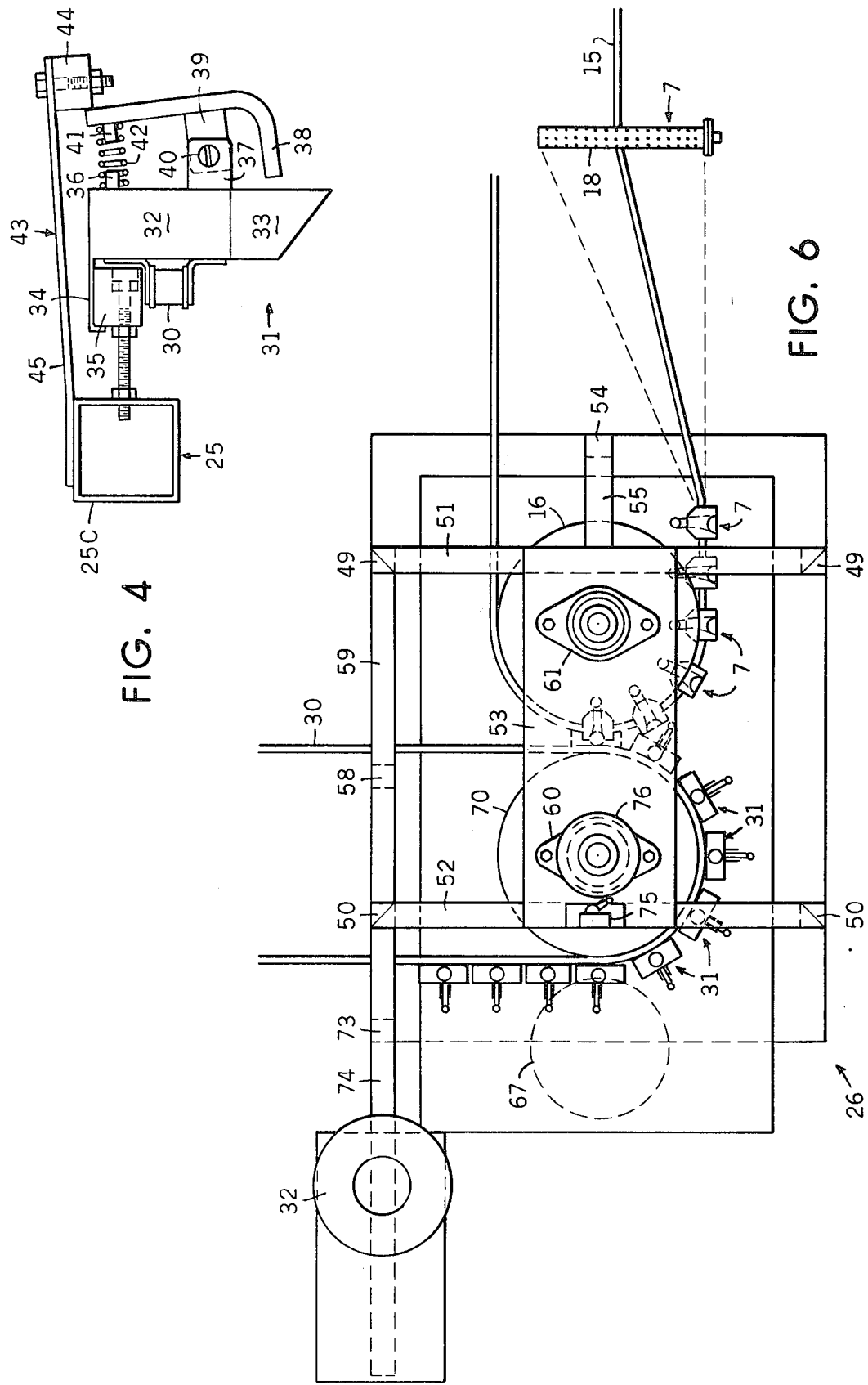

EGG ROLL ASSEMBLY MACHINE

BACKGROUND OF THE INVENTION

This invention relates to apparatus for manufacturing a product wherein a solid body and liquid material are placed in a casing and more particularly, to apparatus for manufacturing a product wherein a yolk body and liquid albumen are supplied to a casing for producing an egg roll product.

In the past, when manufacturing egg roll products, the casing or container holding the egg roll product has normally been physically handled during each of the processing steps in order to obtain an assembled product. Particularly, the yolk portion of the egg roll would be centered in a casing by means of pins, the casing would be filled with albumen and the albumen would then be coagulated and cooked about the yolk. This pinning operation, to insure that the yolk portion was centralized, was costly since it required an additional manual operation which increased the cost of producing an egg roll product. Improvements in the method of centering the egg yolk within the egg roll have allowed liquid albumen to be supplied to the casing and the yolk body to be randomly placed within the egg roll casing, the container is then manipulated in such a manner during the coagulation of the albumen that the centering of the yolk within the albumen is obtained. In preparing the casing containing the yolk body and liquid albumen for the manipulation as previously discussed, a great deal of manual operation was involved which essentially consisted of an operator picking up the egg roll casing, metering a predetermined amount of albumen into the casing and thereafter placing a yolk body therein. Such manual operations are expensive and time consuming when attempting to produce egg rolls on a mass basis. Additionally, the physical handling of the container having the yolk body and the liquid albumen therein was complicated by the lack of a ready means of supporting and transporting the egg roll when in an unsealed condition.

In accordance with this invention, it is possible to eliminate these manual operations and obtain an egg roll product in a casing having an egg yolk body and a predetermined quantity of liquid albumen therein. This invention also makes possible the rapid and continuous assembly of egg rolls in a convenient and economical manner. It should be understood that although the invention is described in terms of preparing an egg roll product, it is equally applicable to assembling a casing having a liquid and a solid body therein. However, since the present invention is primarily utilized in preparing an egg roll product, the specification will be directed to the use of the invention in preparing such products.

SUMMARY OF THE INVENTION

Therefore, the general object of the present invention is to provide a simplified means of assembling an egg roll which may be carried out on a mass production basis.

Another object of the present invention is to provide a simplified means of conveying a casing for containing the egg roll wherein the yolk body and liquid albumen may be automatically supplied to such casing and the casing sealed as it is discharged from the conveyor.

An aspect of the present invention is to provide a machine capable of continuously conveying the casing along a predetermined path of travel and adapted to meter liquid albumen into the casing, insert a yolk body into the casing, and close the casing as it is being conveyed and thereafter discharge the assembled egg roll product in a sealed casing for subsequent processing.

These and other objects and advantages will become apparent hereinafter.

DESCRIPTION OF THE DRAWINGS

FIG. 1A is a plan view of the egg roll assembly portion of the apparatus of the present invention which may be used in carrying out the automatic method of assembling an egg roll;

FIG. 1B is a plan view of the yolk body treatment portion of the apparatus of FIG. 1A;

FIG. 2 is a side view of the yolk body treatment portion of the apparatus;

FIG. 3 is a perspective view of the baskets utilized for carrying the egg yolk body of an egg roll;

FIG. 4 is a side view of the funnel member utilized for conveying the casing of an egg roll and shown biased to an open position;

FIG. 6 is a plan view of the assembly end of the apparatus of the present invention;

DESCRIPTION OF THE PREFERRED EMBODIMENTS

Figure 5:
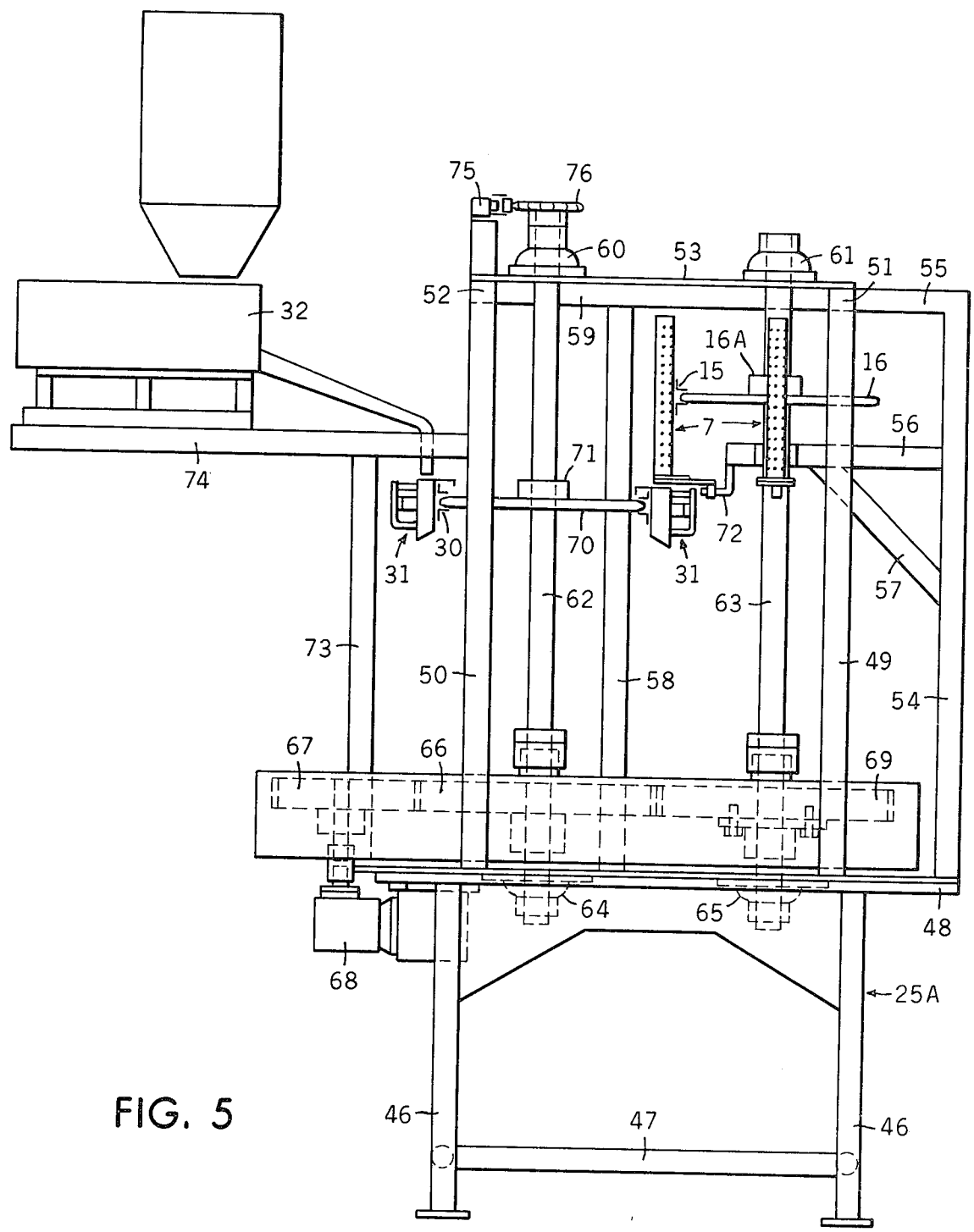
FIG. 5 is an elevation view of the assembly end of the apparatus of the present invention.

Referring now to FIG. 1A and 1B, the egg roll assembly equipment, indicated generally at 1, consists of a yolk body treatment tank and conveyor portion, indicated generally at 2, and the egg roll assembly portion, indicated generally at 3. Briefly, as best shown in FIG. 1B, the egg yolk body treatment apparatus consists of a tank 4 having an intermediate or dividing partition 5 therein to divide the tank into tank compartments 6 and 6A. Each of the compartments 6 and 6A have a slightly sloping bottom therein to the drains, indicated generally at 8, which are adjacent to the divider 5. Extensions 9 are provided from beneath the tank portion 6A to support the shaft 10 thereon. The shaft 10 is provided with a sprocket 11 which is aligned with the center of the tank 4. A pair of guide rails or track members 12 are provided in an undulating manner, as best seen in FIG. 2, through the tank portions 6 and 6A and are supported from the bottom of the tanks by braces indicated at 13. If desired, in order to allow for different speeds of the conveyor and yet obtain the same amount of immersion or dipping of the yolk body into the tanks, the track members 12 may be adjustable to only allow the yolk body to be immersed for the desired period of time. Thus, if the conveyor is operating at a slow speed the track 12 would be adjusted to allow the yolk body to be immersed for a shorter path of travel which would serve to give the same overall dipping as when the conveyor is moving at a faster rate of speed and the track is adjusted to allow the yolk to be retained in the tank for a longer portion of the path of travel. The tracks 12 extend beyond the end of the tank 4 and are positioned to assume a path such that they are vertically aligned at a point adjacent to the egg roll assembly apparatus portion 3. A second set of track members or guides 14 are provided beneath the tank member 4 and also extend beyond the tank to a position adjacent to the egg roll assembly apparatus portion 3 and at that point are in a position in a substantially vertically plane. A chain conveyor, indicated generally at 15, is provided for passage around the sprocket 11 and around the sprocket 16 provided on the egg roll assembly apparatus portion 3. A plurality of yolk holder baskets 7 are connected to the chain conveyor 15 by suitable means, such as welds.

As seen in FIG. 3, each basket consists of a semicircular perforated body portion 18 having a plate 19 welded to one end thereof. A stop or abutment member 20 is provided on the plate member 19 and a trip discharge member 21 is connected to the plate 19 by suitable means, such as a nut and bolt 22. The trip discharge member consists of a plate 23 pivotally connected about the bolt 22 having an enlarged abutment member 24 positioned on one end and the other end thereof is sufficiently large to substantially close or cover the open semi-circular basket portion 18. The baskets 18 are provided for sliding engagement along the rails 12 and 14 such that they are maintained in the proper position during their movement through the yolk body treatment portion 2 of the egg roll assembly machine.

Referring again to FIG. 1A the egg roll assembly portion 3 consists of a frame indicated generally at 25 having an assembly portion or end indicated generally at 26 and a sealing portion or end indicated generally at 27. The frame 25 generally consists of supports 25A and 25B at each end which are connected by horizontally extending bars 25C. This frame construction is more clearly shown and described with respect to FIGS. 5-7. The frame 25 is provided at the assembly end 26 with the sprocket 16 of the yolk body conveyor 15 and a sprocket 70. The frame 25 at the sealing end 27 is provided with a sprocket 29. A chain conveyor 30 having a plurality of funnel members 31 thereon passes around the sprockets 70 and 29 which will be explained in greater detail hereinafter. Additionally, it should be noted that a metering device 32 is provided adjacent to the sprocket 70 and overhangs the funnel members 31 for metering a predetermined quantity of liquid albumen into a funnel member as it passes therebeneath. Any commercially available metering device may be utilized, such as Bursa-Fill, a registered trademark to Bursak Packaging Machinery Corp. machine. Additionally, it should be noted that a vacuum source 33 is provided adjacent to the sealing portion or end 27 for recovering the excess albumen in the casing which will be explained in greater detail hereinafter. It should be noted that a backing plate 34 is provided on the frame 25 which forms a part of the sealing portion 27. The importance of the semi-circular shaped backing plate 34 will be described in detail with the sealing portion of the machine. Further, as will be more fully discussed, the conveyor 15 which passes around the sprocket 16 is spaced a predetermined distance above the conveyor 30 as it passes around the sprocket 70. This predetermined spacing enables the egg yolk body positioned in the baskets 7 on the conveyor 15 to be inserted or deposited into the funnel members 31 on the conveyor 30. Further, desirably the conveyor 30 traverses a substantial distance from the point where the yolk body is inserted into the funnel member 31 until it reaches the sealing portion of the machine 27. This travel time is desirable since it permits air entrapped within the liquid albumen to escape prior to the sealing of the casing.

Referring now to FIG. 4 one of the plurality of funnel members 31 provided on the convey chain 30 is shown. The funnel member 31 is provided with a trapezoidal upper portion 32 which terminates in a tubular lower portion 33. The lower edges of the tubular portion 33 is obliquely cut to allow a casing to be readily placed thereon. The chain conveyor 30 is connected to one side of the trapezoid portion 32 by suitable means, such as welds, and a guide tab 34 is also provided thereon. The guide tab 34 is suitable for sliding on the guide support 35 and for retaining the funnel member in the proper position as it is conveyed by the conveyor 30. The guide support 35 is supported on the horizontal frame member 24 C by suitable means, such as bolts having a lock nut thereon. The trapezoid member 32 on the opposite side thereof is provided with a protuberance or spring retaining member 36 and also a pair of bracket members 37. An abutment or clamping member 38 is provided with an extension 39 which is placed between the bracket members 37 and pivotally connected thereto by means of a nut and bolt 40. The upper end of the clamping member 38 is also provided with a protuberance or spring retaining member 41 with a spring 42 being interposed between the retaining members 36 and 41 for urging the upper portion of the clamping member 38 away from the funnel member 31. The lower portion of the clamping member 38 is provided with an abutment end suitable for releasable gripping engagement of an egg roll casing between the funnel portion 33 and the abutment arm 38. It should be understood that the spring 42 is effective to normally bias the abutment member 38 into engagement with the funnel portion 33. An opening device 43 for urging or biasing the abutment member 38 away from the funnel portion 33 is provided on the apparatus 3. The opening device 43 essentially consists of a tapered shaped bar 44 being secured to the frame 25 C by means of the arms 45. The tapered bar 44 is positioned such that it engages the upper end of the clamping or abutting member 38 to urge that portion of the clamping member towards the funnel member 31 which serves to disengage the abutment portion of the clamping member 38 from the tubular portion 33. The tapered bar member 44 extends along the path of travel of the funnel conveyor chain 30 for a sufficient distance to enable an operator to place casings on to the funnel members as they pass thereby. The disengagement of the upper portion of abutment member 38 from the tapered bar 44 permits the spring 42 to urge the abutment member 38 toward engagement with the tubular portion 33 and releasably grip the casing therebetween.

Referring now to FIGS. 5 and 6, the assembly end 26 of the egg roll assembly portion 3 of the apparatus is shown. The frame 25 A of the assembly end of the apparatus portion 3 consists of four vertically extending tube members 46 which are connected by cross braces 47 to support the plate member 48 thereon. Attached to the plate member 48 are a pair of vertical brace members 49, and a pair of vertical brace members 50 which are connected by cross braces 51 and 52 respectively. A plate 53 is connected between the cross braces 51 and 52.

A vertically extending brace 54 has one end connected to the plate 48 and the other end connected to a cross brace 55 which is connected to the brace 51. Another brace member 56 is connected to the brace 54 and is supported by the member 57. Another vertical brace 58 has one end connected to the plate 48 and the other end connected to a brace 59 which extends between the members 51 and 52. The horizontal braces 25 C are connected to the vertical brace members 50 and 58 to be in close relationship to the path of conveyor 30 as previously described. The plate member 53 is provided with suitable bearing members 60 and 61 for supporting the shafts 62 and 63 which extend through the plate member 48 and are journaled in the bearings 64 and 65 provided thereon. The shaft 62 is provided with a gear member 66 adjacent to the lower end thereof with the gear 66 being driven by gear 67 connected to a motor 68 suitably attached to the plate 48. The gear 66 is also in driving contact with the gear member 69 connected to the lower portion of the shaft 63. A sprocket 70 is provided on the shaft 62 at the immediate position thereof for receiving the conveyor chain 30 carrying the plurality of funnel members 31 thereon. This sprocket 70 may be connected to the shaft 62 by suitable means, such as the collet 71. The sprocket 16 is journaled on the shaft 63 and retained thereon by means of the collet 16 A. The sprocket 16 serves to drive the conveyor 15 carrying the yolk body baskets 7. It should be noted that as previously discussed the sprocket 16 must be provided at a predetermined distance above the sprocket 70, such that the yolk basket members 7 are positioned directly above the funnel members 31, as the two conveyors pass around the sprockets 16 and 70 and are positioned as shown in the FIGS. 5 and 6. Further, by having the shafts 62 and 63 driven by intermeshing gears 66 and 69, the relative speed of the conveyors for the funnel members and for the yolk bodys is substantially controlled to achieve the registry of the yolk body basket 7 with the funnel member 31. Other means for achieving the registry of the two members, so as to insure the alignment of the yolk body with the funnel members may be utilized and will be apparent to those skilled in the art. A trip arm or mechanism 72 is provided on the vertical brace member 56 for engagement with the abutment portion 24 of the yolk basket member 7, such that the engagement serves to move the engagement plate 23 permitting the yolk carried by the basket 18 to be discharged or inserted into the funnel member 31.

A vertical brace 73 is connected to the plate 48 and connects with a horizontal support member 74. The support member 74 is also connected to the vertical brace 50. The liquid albumen metering device 32 is mounted on the support member 74 and includes a portion which overhangs the funnel member 31 as they are conveyed along the apparatus. Desirably, the metering device will be connected to a limit switch 75 which is mounted on the plate 53 adjacent to the shaft 62. Additionally, a sprocket 76 is provided on the upper end of the shaft 62 for contact with the limit switch 75. By means of the sprocket 76 and limit switch 75 the activation of the metering device 32 may be controlled to dispense the predetermined quantity of albumen into the funnel member 31. It should be noted that the opening in the upper portion of the trapezoidal portion 32 of the funnel 31 is sufficiently large so that the albumen may be metered into the funnel without the necessity of the conveyor 30 being slowed down or stopped.

Figure 7:
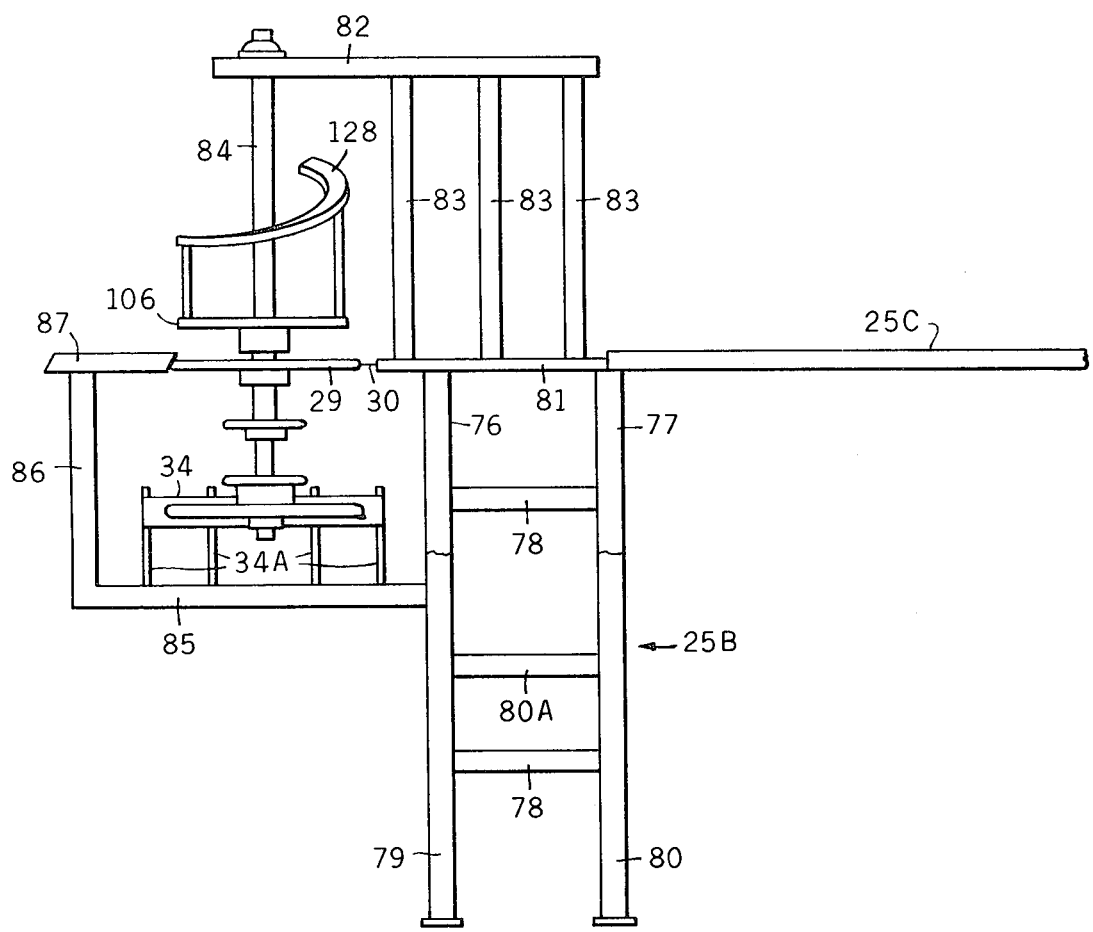
FIG. 7 is an elevation view of the frame construction of the sealing end of the apparatus of the present invention.
Figure 8:
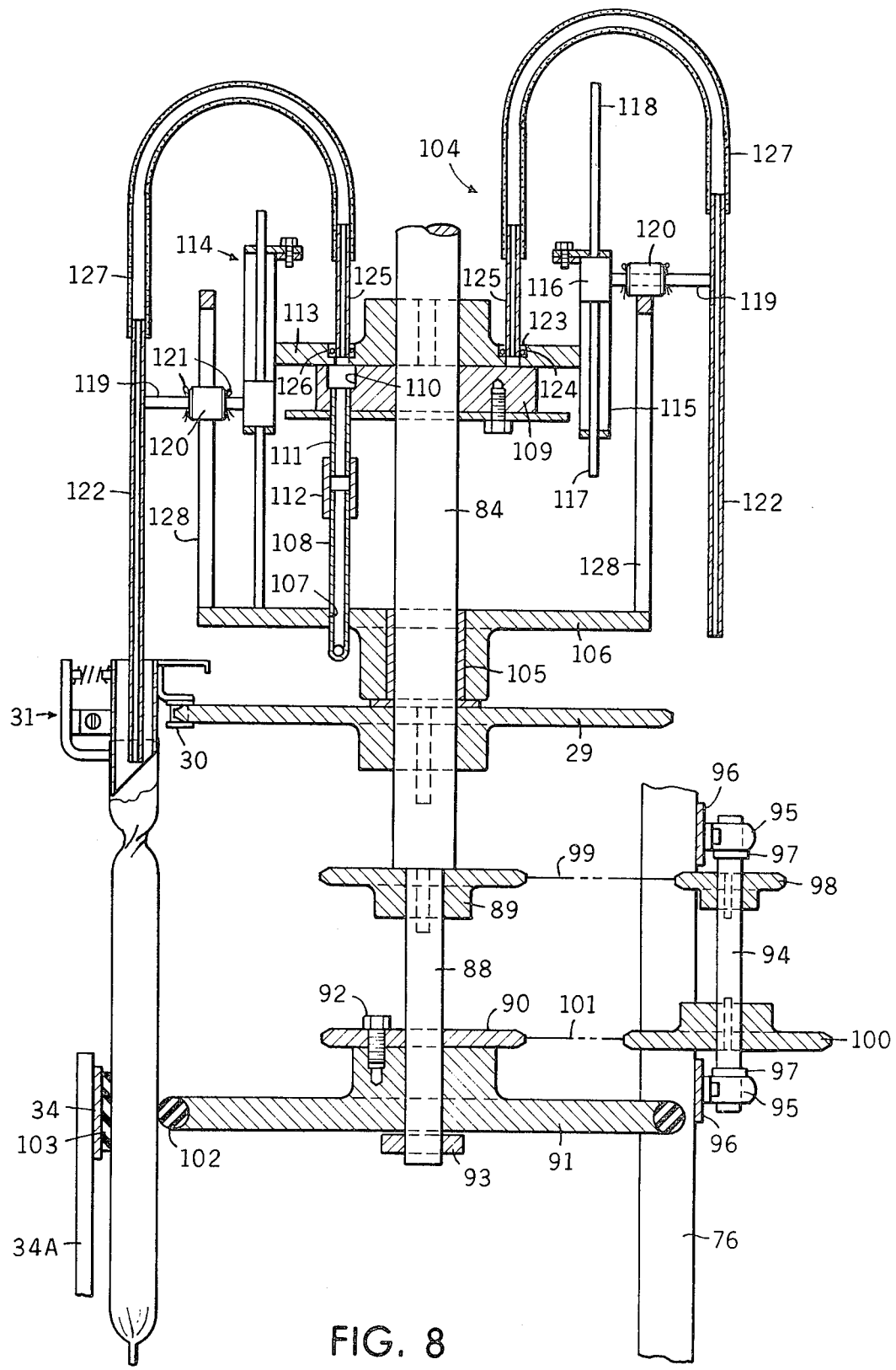
FIG. 8 is a sectional view taken along the line 8 - 8 of FIG. 1A.

Referring now to FIGS. 1A, 7 and 8, it will be seen that the frame 25 B of the sealing end 27 of the apparatus is provided with vertical supports 76 and 77 which are connected by the cross braces 78. Desirably, additional support members 79 and 80 connected by brace 80 A may be provided on opposite sides of the apparatus to provide increased stability thereof. A plate 81 is provided on the upper end of the vertical supports 76 and 77. Additionally, it should be noted that the horizontal frame members 25 C are attached to the vertical supports 77. A plate 82 is supported on the plate 81 by a plurality of vertical supports 83. The shaft 84 is journaled in the plate member 82 with the shaft 84 serving to carry the sprocket 29. Additionally, it should be noted that brace members 85 and 86 are provided on the vertical member 76 for supporting the vacuum clipping device 87. The vacuum clipping device 87 extends to a point in registry with the conveyor 30, such that the clips may be applied to the casing of the egg roll being assembled. Any conventional commercially available clipping device may be utilized, such as are well known in the art, and available from suppliers, such as the Rheem Manufacturing Company.

As previously discussed, the shaft 84 has provided thereon the sprocket 29 which receives the conveyor 30 and which is driven thereby. Connected to the lower portion of the shaft 84 is a reduced shaft portion 88 with a sprocket member 89 mounted at the juncture of the two shafts. A second sprocket member 90 is provided on the shaft 88 and is connected to a twist wheel 91 by suitable means such as the bolt 92. The twist wheel 91 is maintained on the shaft 88 by means of the set collar 93 provided on the lower end of the shaft. It should be understood that the twist wheel 91 and sprocket 90 is positioned for relative movement and rotation with respect to the shaft 88. A shaft 94 is suitably journaled and connected to the frame of the machine by means of brackets 95 mounted on braces 96 which are connected to the braces 76. The shaft 94 is maintained in position by means of the lock rings 97 thereon. A sprocket 98 is provided on the shaft 94 and is connected to the sprocket 89 by means of a drive chain 99. A second sprocket 100 is provided on the shaft 94 and is connected to the sprocket 90 by means of the drive chain 101. It should also be noted that the sprockets 98 and 100 are sized such that the rotation of the twist wheel 91 will be faster than the rotation of the conveyor 30 by means of the sprocket 29 which desirably maintains the casing in a vertical position as the casings are carried by the conveyor 30. However, depending upon the size of casing used, the sprockets may be arranged so that the rotation of the twist wheel 91 will be slower than the rotation of sprocket 89. This is particularly important when large diameter casings are used. The important feature being that the twist wheel 91 causes the lower portion of the egg roll casing to roll along the backing plate 34 to cause the twisting or spinning of the casing. The twist wheel 91 is also provided with a rubber o-ring or tire member 102 which is adapted for engagement with the egg roll casing. The backing plate 34 is connected to the frame 85 by the members 34A and defines a semi-circular shape spaced a predetermined distance from the outer periphery of the o-ring 102 on twist wheel 91. A rubber strip 103 is provided on the backing plate 34 to provide a surface for contacting the egg roll casing which will serve to prevent damage or rupture of the egg roll casing when it is brought into engagement therewith. As can be seen with the egg roll casing in engagement with the rubber strip 103 and the o-ring 102 such that the lower portion of the egg roll casing is caused to move at a speed different than the speed of the conveyor 30 and the upper portion of the egg roll casing, a twisting or rotating action of the casing is obtained at the upper end of the egg roll casing.

Additionally, the upper portion of the shaft 84 is provided with a vacuum re-claim arrangement indicated generally at 104. The shaft 84 is provided with a bushing 105 which is in abutment with the sprocket 29 and which has connected thereto a lower platform 106 for the vacuum re-claim system 104. An opening 107 is provided in the platform 106 to permit the tube 108 to pass therethrough to the vacuum source or apparatus 33. The shaft 84 is also provided with a fixed spacer member 109 thereon. The fixed spacer member has a groove 110 in the upper surface thereof which extends a predetermined distance around the spacer 109 and which connects with a tube 111. The tube 111 is connected to the tube 108 by means of a slip coupling 112. Rotatably mounted to the shaft 84 is an upper platform 113. The upper platform 113 has mounted on the periphery thereof a plurality of guide members indicated generally at 114. The guide members 114 generally consist of a block 115 having a slot or groove therein for receiving the guides 116 having guide pins 117 and 118 connected thereto. The guides 116 are free for reciprocal movement within the block 115 as shown with the guide pins 117 and 118 serving to maintain the guides 116 in the proper position to prevent it from hanging up or assuming an improper position. Extending transversely from the guides 116 is a rod 119 having a roller 120 mounted thereon. The guide roller 120 may be mounted on the rod 119 by any suitable means, such as by use of cotter pins 121. Connected to the outer extremities of the rod 119 is an extended length of stainless steel tubing 122. As is obvious, the stainless steel tubing will be moved in a vertical position in direct relationship with the movement of guides 116 within the block 115. It should be understood that the rod 119 positions the tube 122 such that it is in registry with the funnel member 31 and the spacing of the tubes and rotation of the platform provides that a tube be inserted in each funnel member as it passes around the sprocket 29.

The upper platform 113 is also provided with a plurality of openings 123 having a recessed portion 124 for receiving stainless steel tubing 125 therein. The openings 123 are positioned to register with the groove 110 during a portion of the rotary movement of the upper platform 113. An o-ring 126 forms a fluid pressure seal between the tube 125 and the recessed portions 124. Additionally, a piece of flexible tubing 127 is provided between the upper end of the tube 125 and the tube 122 such that fluid pressure communication may be established between the vacuum source 33 through the tubes 108 and 111, the groove 110, the opening 123 and the tubes 125 and 127 and ultimately to the stainless steel tube 122. Additionally, a ramp support 128 is provided on the lower platform 106 and provides a surface along which the rollers 120 are moved. Thus, as the upper platform 113 is rotated the rollers 120 are urged along the ramp 128 with the guides 116 being moved in relation to the slope of the ramp from a position wherein the tube 122 may be in its lowest or ablumen re-claiming position to its upper most or nonfunctional position (as shown by the sightward position in FIG. 8). Further, it should be understood that the ramp support 128 is provided with an abrupt drop off which is predeterminately located such that the tube 122 may be inserted into the upper end of the casing during which time the tube 122 is connected to the vacuum source as previously described for effecting the removal of the albumen foam from the casing prior to the sealing thereof and after the sealing of the casing the rollers movement along the ramp urges the tube 122 to its upward position. Additionally, it may be desirable to provide guides or rails on the apparatus at a point adjacent the engagement of the casing with the twist wheel 91. These guides or rails would serve to force the yolk body toward the lower portion of the casing or restrain the yolk body within the liquid albumen. This may be desired, since the yolk has a tendency to rise in the albumen, to prevent the yolk from being broken or squeezed as the casing is twisted by the twist wheel.

In the operation of the present apparatus, the motor 68 is energized which serves to drive the gears 66 and 69, such that the sprockets 16 and 70 are rotated in the direction as shown by the arrows in FIG. 1A. Thus, the sprocket 68 moves the conveyor 30 having the funnel members 31 thereon at a predetermined rate of speed about the sprocket 29. The sprocket 16 serves to move the conveyor 15 having the basket members 7 thereon about the sprocket 11 with the relative movement of the conveyors 15 and 30 being such that the baskets 7 will be in alignment with the funnel member 31 substantially as shown in FIG. 5. The tank 6 of the yolk body treatment portion of the apparatus is filled with rinse water and the tank 6A is filled with a hydrogen peroxide solution for subjecting the yolk bodies to a treatment substantially as described in assignee's U.S. Pat. No. 3,598,612. An operator or an automatic loading device is positioned to place or insert the yolk bodies into the baskets 7 as they travel around the sprocket 11 and thereafter as the conveyor 15 carries the baskets along the track 12, the yolk bodies contained in the baskets are subjected to the hydrogen peroxide treatment and the rinse water in the tanks 6 and 6A. The yolk bodies are then conveyed along the tracks 12 to pass around the sprocket 16. Simultaneously, with the yolk bodies being conveyed by the conveyor 15, the operator is positioned to place the egg roll casings or containers onto the tubular portion 33 of the funnel members 31 at the tapered bar member 44 as previously discussed. The casing or containers will be of a suitable flexible material such as a standard sausage casing made of regenerated cellulose coated with saran or other suitable material. After the casing has been placed onto the tubular member, the abutment member 38 moves out of engagement with the tapered bar 44 with the spring 42 urging the abutment member 38 toward the tubular member 33 serving to releasably engage the egg roll casing onto the funnel member 31. As the funnel member 31, having the casing thereon, passes beneath the albumen metering device 32, the limit switch 75 is activated serving to discharge a predetermined quantity of albumen into the funnel member 31 and the casing contained thereon. As previously noted, the funnel member 31 is designed such that the predetermined quantity of albumen may be metered thereto as the funnel member is being conveyed by the conveyor 30 and without the necessity of stopping the movement of the conveyor. As the funnel member 31 having the albumen filled casing thereon passes about the sprocket 70, the basket member 7 passing around the sprocket 16 is brought into registry with the funnel member 31. The trip arm 72 then engages the abutment member 24 of the basket 7 moving the plate 23 and permitting the yolk body to fall by the force of gravity into the funnel member 31 and the albumen filled casing. The conveyor 30 then carries the egg roll casing toward the sealing end 27 of the apparatus. This dwell time or lapse of time during which the funnel member 31 is conveyed from the assembly end to the sealing end is desirable since it permits substantially all of the air entrapped within the albumen to escape. As the funnel member 31 carrying the casing begins to pass about the sprocket 29, the tube 122 is dropped through the funnel member 31 into the upper portion of the casing as the opening 123 comes into registry with the groove 110 in the spacer member 109. This serves to establish pressure fluid communication between the vacuum source 33 and the tube 122 through the tubes 127 and 125, 111 and 108, as previously discussed. With the vacuum source 33 in pressure fluid communication with the tube 122 the albumen foam which accumulates near the upper portion of the egg roll casing may be removed and the vacuum also serves to remove substantially all of the entrapped air within the liquid albumen prior to the sealing of the casing. This albumen which is recovered from the vacuum source may be recycled into the albumen metering device 32 or may be discarded depending upon the operator's preference. Additionally, as the funnel member 31 passes about the sprocket 29 the lower portion of the casing is brought into engagement between the rubber strip 103 on the backing plate 34 and the rubber o-ring 102 on the twist wheel 91. As previously discussed, due to the sprocket arrangement of sprockets 90 and 100, the twist wheel 91 is rotated at a faster speed than the rotation of the sprocket 29. Due to the relative movement between the upper portion of the egg roll casing connected to the funnel member 31 and the lower portion of the egg roll casing with the twist wheel 91 being effective to roll the lower end of the casing along the backing plate 34, a twisting or rotation action of the egg roll casing is obtained by the casing at the point of the level of the liquid albumen within the casing. This twisting or rotating of the casing is attained by the conveyor 30 passing around the sprocket 29 and the relative movement of the twist wheel 91. As the conveyor 30 continues its movement about the sprocket 29, the casing at the point of closing or constraint engages the vacuum clipping device 87. This device upon engagement with the egg roll casing automatically clips the casing and severs the assembled casing from the small portion which is retained by the funnel member 31. The egg roll casing as discharged from the apparatus thus consists of a solid yolk body within a predetermined quantity of albumen having both ends of the casing clipped or sealed. The egg roll casing is then in a condition for subsequent processing as is well known in the art.

From the foregoing, it is now apparent that applicant has set forth a novel apparatus and method for continually assembling an egg roll product and that obvious modifications or changes may be made in the method and apparatus set forth herein by way of illustration without departing from the spirit of the invention as set forth by the claims as follows.

I claim:

1. Apparatus for automatically and continuously assembling an egg roll product comprising a frame, conveyor means on said frame defining a predetermined path of travel, drive means on said frame for continuously driving said conveyor means without interruption, said conveyor means including means for grippingly engaging and retaining thereon an egg roll casing having one end thereof open, first metering means on said frame positioned above a portion of the path of travel of said conveyor means for discharging a predetermined quantity of liquid albumen into said continuously moving casing, second means positioned above another position of the path of travel of said conveyor means for inserting a yolk body into said casing, other means on said frame for sealing the open end of said casing and for discharging said casing from said conveyor means, and rotating means on said frame adjacent to said sealing means for rotating the casing to close the open end thereof prior to the sealing thereof.

2. The apparatus according to claim 1 including vacuum means on said frame adjacent to said sealing means, said vacuum means including reciprocally movable arms adapted for insertion into said casing and removable therefrom, said reciprocally movable arms being retained within said casing for a sufficient period of time to remove substantially all of the entrapped air from the liquid albumen prior to their removal from said casing.

3. The apparatus according to claim 1 wherein said means included on said conveyor means comprises a plurality of funnel members, each of said funnel members including a clamping means normally biased to a position for engaging and retaining a casing on said funnel member, said clamping means being adapted for movement to a position disengaged from said funnel member for permitting the removal and placement of a casing on said funnel member.

4. The apparatus according to claim 3 wherein said clamping means includes a spring biased clamping member for grippingly engaging and selectively retaining said casing on said funnel members.

5. The apparatus according to claim 4 wherein said spring biased clamping member comprises an arm member pivotally connected to said funnel member, a spring connected to one end of said arm member and to said funnel member for urging the opposite end of said arm member toward a position in engagement with said funnel member for grippingly engaging and selectively retaining said casing on said funnel member.

6. The apparatus according to claim 1 including a tank having liquid containing compartments therein, said second conveyor having a path of travel through the compartments of said tank for dipping the yolk body carried by said second conveyor.

7. The apparatus according to claim 1 including discharge means on said basket members for controlling the inserting of the yolk body into said casing, said discharge means including a plate pivotally connected to said basket member and adapted to retain the yolk body in said basket member when positioned in a substantially vertical position, an abutment member provided on said plate and engageable with said frame at the point of registry of said second conveyor and said conveyor means, said plate being movable in response to the engagement of said abutment member by said frame to a position permitting the yolk body to be inserted into said casing by the force of gravity.

8. The apparatus according to claim 1 wherein said rotating means comprises a twist wheel on said frame, means on said frame for driving said twist wheel at a different speed than the speed of said conveyor means, and a backing plate positioned on said frame a predetermined distance from the periphery of said twist wheel, the lower portion of said casing being received between said twist wheel and said backing plate while the upper portion of said casing is being conveyed by said conveyor means whereby the relative speeds of said conveyor means and said twist wheel impart a rotating motion to said casing to close the open end thereof.

9. The apparatus according to claim 8 including means on said frame adjacent to the path of travel of said one conveyor means for urging the yolk body downward in the casing prior to the casing being received between said twist wheel and said backing plate.

10. The apparatus according to claim 1 including activation means on said frame responsive to the presence of a casing beneath said metering means for metering a predetermined quantity of albumen into said container.

11. Apparatus for automatically and continuously assembling a casing having a solid product contained within a liquid material comprising a frame, a pair of conveyor means on said frame defining a predetermined path of travel, drive means on said frame for continuously driving said pair of conveyor means to maintain said pair of conveyor means in registry at a point of their paths of travel, one of said means including funnel means for grippingly engaging and retaining thereon a casing having one end thereof open, metering means on said frame positioned above a portion of the path of travel of said one conveyor means for discharging a predetermined quantity of liquid through said funnel means and into said casing, the other of said conveyor means including means for carrying the solid product, said other conveyor means being positioned a predetermined distance above said one conveyor means at the point of registry of the paths of travel of said one and conveyor means, said other conveyor means at the point of registry with said one conveyor means being adapted to insert the solid product through said funnel means into said casing, and clipping means on said frame at another point on the path of travel of said one conveyor means for sealing the open end of said casing and for discharging said casing from said one conveyor means.

12. The apparatus according to claim 11 including rotating means on said frame adjacent to said clipping means for rotating said casing to close the open end thereof prior to the clipping of said casing.

13. The apparatus according to claim 12 wherein said rotating means comprises a twist wheel on said frame, means on said frame for driving said twist wheel at a different speed than the speed of said one conveyor means, and a backing plate positioned on said frame a predetermined distance from the outer periphery of said twist wheel, the lower portion of said casing being received between said twist wheel and said backing plate while the upper portion of said casing is being conveyed by said one conveyor means whereby the relative speeds of said conveyor means and said twist wheel impart a rotating motion to said casing to close the open end thereof.

14. Apparatus for automatically and continuously assembling an egg roll product comprising a frame, a pair of conveyor means on said frame defining a predetermined path of travel, drive means on said frame for continuously driving said pair of conveyor means to maintain said pair of conveyor means in registry at a point of their paths of travel, one of said conveyor means including means for releasably engaging a container at the open end thereof, metering means on said frame positioned above a portion of the path of travel of said one conveyor means for discharging a predetermined quantity of liquid albumen into said container, the other of said conveyor means including means for carrying an egg yolk body, said other conveyor means being positioned a predetermined distance above said one conveyor means at the point of registry of the paths of travel of said one and other conveyor means, abutment means on said frame engageable with said other conveyor at the point of registry of said one and other conveyor, means for permitting the yolk body to be discharged into said container, and clipping means on said frame at another point on the path of travel of said one conveyor means for sealing the open end of said container and for discharging said container from said one conveyor means.

15. The apparatus according to claim 14 including vacuum means on said frame adjacent to said clipping means, said vacuum means including reciprocally movable arms adapted for insertion into said container and removable therefrom as said containers are conveyed by said one conveyor means, said reciprocally movable arms being retained within said container for a sufficient period of time to remove substantially all of the entrapped air from the liquid albumen prior to their removal from said container.

16. The apparatus according to claim 14 including rotating means on said frame adjacent to said clipping means for rotating the container to close the open end thereof prior to the sealing thereof.

17. The apparatus according to claim 16 wherein said means on said one conveyor means for releasably engaging a container at the open end thereof comprises a plurality of funnel members, and spring biased clamping members on said funnel members for grippingly engaging and selectively retaining said containers on said funnel members.

18. The apparatus according to claim 14 including a twist wheel on said frame, means on said frame for driving said twist wheel at a different speed than the speed of said one conveyor means and a backing plate positioned on said frame a predetermined distance from the periphery of said twist wheel, a portion of said container being received between said twist wheel and said backing plate while said container is being conveyed by said one conveyor means whereby the relative speeds of said one conveyor means and said twist wheel impart a rotating motion to said container to close the open end thereof.

19. The apparatus according to claim 18 wherein said means on said one conveyor means for releasably engaging a container at the open end thereof comprises a plurality of funnel members on said one conveyor means, an arm member pivotally connected to said funnel member, a spring connected to one end of said arm member and to said funnel member for urging the opposite end of said arm member toward a position in engagement with said funnel member for grippingly engaging and selectively retaining said container on said funnel member.

20. The apparatus according to claim 18 wherein the means on said other conveyor means for carrying an egg yolk body comprises a plurality of basket members on said other conveyor means, the predetermined distance said other conveyor means is positioned above said one conveyor means being sufficient for said basket members to be positioned in a substantially vertical position at the point of registry of said one and other conveyor means, and discharge means on said basket member engageable with said abutment means, said discharge means being movable in response to the engagement with said abutment means to a position permitting the yolk body to be inserted into said container by the force of gravity.

21. The apparatus according to claim 20 including a tank having liquid containing compartments therein, said other conveyor means having a path of travel through said compartments of said tank for dipping the yolk body carried by said other conveyor means.

22. The apparatus according to claim 18 including means on said frame adjacent to the path of travel of said one conveyor means for urging the yolk body downward in the container prior to the container being received between said twist wheel and said backing plate.

23. The apparatus according to claim 22 including activation means on said frame responsive to the presence of a container beneath said metering means for metering a predetermined quantity of albumen into said container.

* * * * *

UNITED STATES PATENT OFFICE
CERTIFICATE OF CORRECTION

Patent No. 3,884,136　　　　　　　　　Dated May 20, 1975

Inventor(s) Jack R. Towry

It is certified that error appears in the above-identified patent and that said Letters Patent are hereby corrected as shown below:

Column 4, line 17 - "24 C" should read "25 C"

Column 10, line 19 - insert "continuously moving" after the word "said"

Signed and Sealed this twenty-third Day of September 1975

[SEAL]

Attest:

RUTH C. MASON
Attesting Officer

C. MARSHALL DANN
Commissioner of Patents and Trademarks